United States Patent [19]

Minami et al.

[11] Patent Number: 4,698,552
[45] Date of Patent: Oct. 6, 1987

[54] LIGHT CONTROL APPARATUS FOR AUTOMOBILE

[75] Inventors: Katsuhiro Minami; Hitoshi Iwata; Kenichi Kinoshita, all of Aichi, Japan

[73] Assignee: Kabushiki Kaisha Tokai Rika Denki Seisakusho, Japan

[21] Appl. No.: 730,186

[22] Filed: May 3, 1985

[30] Foreign Application Priority Data

May 4, 1984 [JP] Japan .............................. 59-64736[U]
May 4, 1984 [JP] Japan .............................. 59-64737[U]

[51] Int. Cl.$^4$ ............................................. B60Q 1/02
[52] U.S. Cl. ............................... 315/82; 315/DIG. 4; 361/399; 361/401; 338/174
[58] Field of Search ................... 315/DIG. 4, 82, 83; 361/399, 401; 338/174, 198

[56] References Cited

U.S. PATENT DOCUMENTS

| | | | |
|---|---|---|---|
| 3,997,820 | 12/1976 | Stefani | 315/DIG. 4 |
| 4,342,946 | 8/1982 | Valenzona et al. | 315/83 |
| 4,400,685 | 8/1983 | Chestnut | 338/174 |
| 4,521,761 | 6/1985 | Welch | 338/174 |

Primary Examiner—Saxfield Chatmon
Attorney, Agent, or Firm—Lowe, Price, LeBlanc, Becker & Shur

[57] ABSTRACT

A light control apparatus for an automobile which does not employ an already completed variable resistor. A circuit substrate is provided with a terminal integrated with a resistor of a variable resistor. On the other hand, a casing containing the substrate is provided with a sliding terminal of a variable resistor. The casing is formed at its one end with an extended outer shell portion which together with the terminal serves as a connector.

8 Claims, 27 Drawing Figures

LIGHT CONTROL APPARATUS FOR AUTOMOBILE

BACKGROUND OF THE INVENTION

This invention relates to an improvement on a light control apparatus for an automobile which is designed to control the brightness of the illumination light illuminating, for example, a panel board of a dash panel of an automobile.

Figure 26:
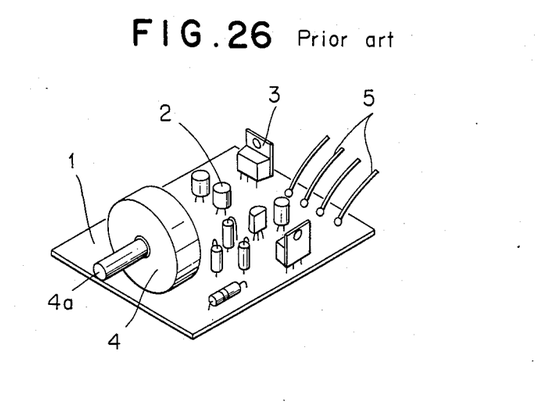
FIG. 26 is a perspective view of a conventional light control apparatus for an automobile, when viewed from one direction.
Figure 27:
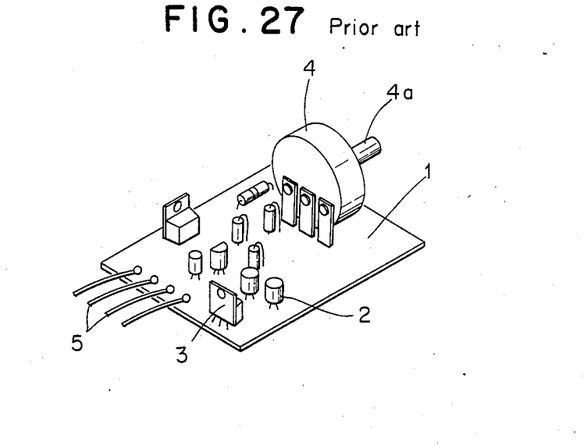
FIG. 27 is likewise a perspective view of the above, but showing when viewed from the other direction.

An automobile light control apparatus of this type is known as shown in FIGS. 26 and 27. This prior art will be described hereunder.

1 denotes a mother board of a printed board on which a circuit pattern is printed. Soldered at appropriate circuits are electronic parts 2 of an oscillating circuit, a power transistor 3 of an electric power driver circuit, and a rhoostate or varible resistor 4 for varying the duty of switching. Lead wires 5 from this mother board 1 as well as a shaft 4a of the variable resistor 4 are led out from a casing (not shown). The lead wires 5 are connected to an electric power source and illumination lamp, thereby enabling to vary the duty of self-oscillating switching in order to adjust the voltage to the illumination lamp for controlling the brightness of the illumination lamp.

As seen in the above, the conventional automobile light control apparatus uses a variable resistor which is already completed as a variable resistor. Because of the foregoing, it has such a disadvantage as the casing thereof is necessarily made large which eventually requires a large installation space and high costs.

Moreover, since almost no consideration is paid to a temperature to the power transistor of the electric power driver circuit, the prior art apparatus has much possibility to go out of order. In addition, since the lead wires led out of the mother board are connected to the lead wires from an electric power source and illumination lamp, an intermediate connector is required.

The present invention was accomplished in order to remove the above mentioned disadvantages.

SUMMARY OF THE INVENTION

It is therefore a general object of the invention to provide a light controlling apparatus for an automobile, wherein a substrate including electronic parts is provided with a resistor of a variable resistor so that when assembled, it serves as a completed variable resistor.

Another object of the invention is to provide a light controlling apparatus for an automobile, wherein an intermediate connector is not required.

A further object of the invention is to provide a light controlling apparatus for an automobile, wherein the heat radiation of a power transistor is made sufficient so that a possible breakdown can be prevented beforehand.

A still further object of the invention is to provide a light controlling apparatus for an automobile which is mostly used in such a casing where the heating value is not large, or no consideration may be paid to the heat radiation of the power transistor, since the substrate is made of ceramic or a metal plate coated with an insulating material, and therefore, has sufficient effect of heat radiation as well as heat-resisting property.

An even further object of the invention is to provide a light controlling apparatus for an automobile which can be made compact and yet reliable.

An additional object of the invention is to provide a light controlling apparatus for an automobile, wherein the number of component parts can be reduced and low costs can be obtained.

In order to achieve the above objects, there is essentially provided a light controlling apparatus for an automobile comprising a casing having a plurality of walls to define a chamber therein, said casing further having an opening at a selected side, a selected one of said walls having a plurality of holes therein; a mounting plate adapted to radiate heat and be affixed within said casing, said mounting plate having at least one terminal section inserted through one of said holes and said mounting plate having a power transistor mounted thereon: a substrate mounted on said mounting plate and adapted to serve as a printed board including a resistor coating and electronic parts; and a knob provided movably within said casing and having a variable resistor terminal adapted to slide over said resistor coating upon said movement within said casing, part of said knob projecting from said casing through said opening for manual operation.

BRIEF DESCRIPTION OF THE DRAWINGS

The nature of this invention, as well as other objects and advantages thereof, will be readily apparent from the following description with reference to the accompanying drawings wherein.

DETAILED DESCRIPTION OF THE EMBODIMENTS

Referring first of FIGS. 1 through 5, a first preferred embodiment of the present invention will be described.

Figure 1:
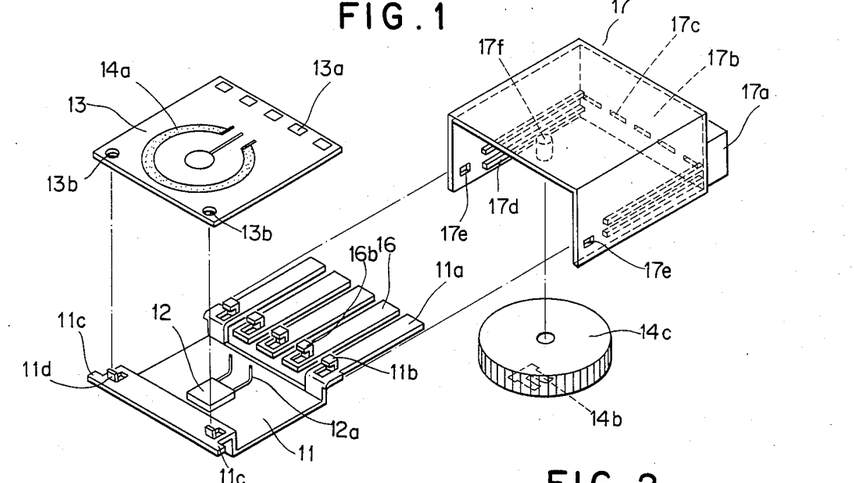
FIG. 1 is an exploded perspective view of a first embodiment according to the present invention.

11 denotes a heat radiating mounting plate made of metal having a high heat conductive property. The mounting plate 11 is in a generally channel shape and has a main section and a pair of first and second wind sections. The plate 11 is formed at its one side with terminal section 11a. Each terminal section 11a is formed intergrally extending from tops of the first wing sections and provided at its root portion with a punched-out piece which is folded. The mounting section of the mounting plate 11 extending from the second wing section is formed at its other sides with projections 11c projecting in the right and left directions, and projecting pieces 11d folded upward. The plate 11 is also mounted at its central portion with a power transistor 12 having a large heating value. The transistor 12 is fixed to the plate 11 in such a manner as to face its heat radiating surface thereto.

Figures 2, 3, 4, 5:
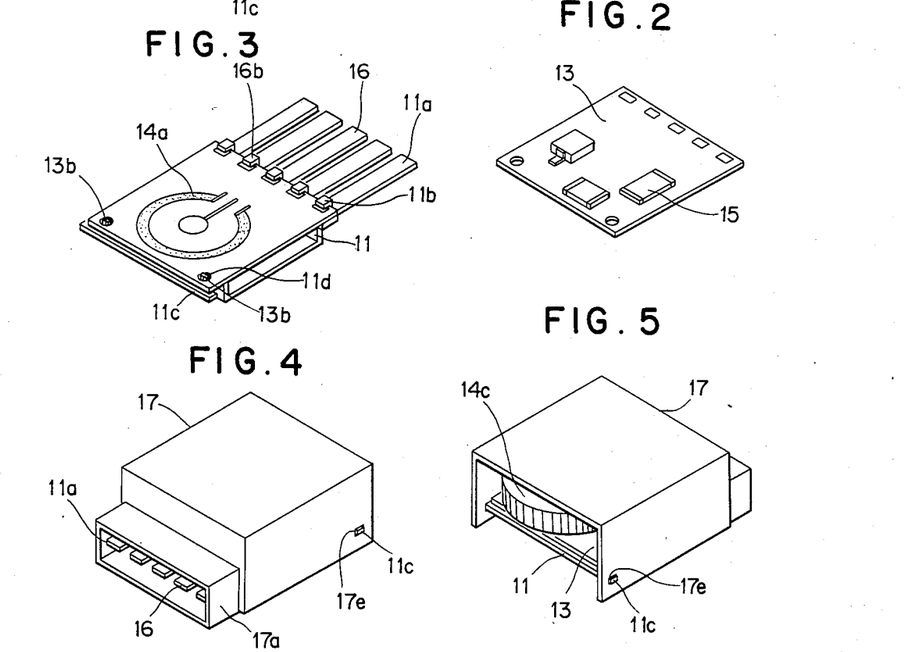
FIG. 2 is a perspective view illustrating the rear surface of a substrate according to the first embodiment of the invention.
FIG. 3 is likewise a perspective view of the substrate, when assembled, according to the first embodiment of the invention.
FIG. 4 is a perspective view illustrating an assembled state of the first embodiment of the invention, when viewed from one direction.
FIG. 5 is likewise a perspective view of the above, but showing when viewed from the other direction.

13 denotes a substrate as a printed board having rounds 13a for mounting the terminals and through holes 13b. The printed board 13 is also provided at its one surface with a resistor coating 14a of a variable resistor. In addition, the substrate 13 is printed at the same or rear surface thereof with a circuit pattern, and electronic parts 15 are soldered at predetermined places thereon.

The substrate 13 may be made of such material as having a low heat conductive property. Likewise, the substrate 13 may be mounted with such electronic parts 15 as having low heat resisting property. In other words, the substrate 13 can be of a poor heat characteristic without any problems.

16 denotes terminal plates which are formed at the root portions with each of punched-out pieces 16b as in the casing with the terminals 11a of the heat radiating plate 11.

The terminals 11a and terminal plates 16 of the heat radiating mounting plate 11 is attached to the substrate 13 in such a manner as to hold the substrate 13 with the punched-out pieces 11b and 16b. Thereafter, the rounds 13a and the punched-out pieces 11b and 16b are soldered together.

On the other hand, the projecting pieces 11d of the heat radiating mounting plate 11 are inserted in the through holes 13b of the substrate 13 and soldered together. In this way, the heat radiating mounting plate 11 and the terminal plates 16 are attached to the substrate 13. The lead 12a of the power transistor 12 are also soldered to the circuit pattern of the substrate 13.

17 denotes a casing made of an insulating material such as plastic. Said casing 17 has a plurality of walls to define a chamber but does not have one at front side thereof to serve as an opening. The casing 17 is formed with a rearside wall 17b opposite said opening and with an outer shell of a connector behind said wall 17b. Said partition wall 17b is formed with inserting holes 17c therein. At inner surfaces of side walls, there are formed with supporting rails 17d and retaining holes 17e, and at inner surface of the top wall with a shaft 17f for rotatably mounting a wheel 14c of a variable resistor including a sliding terminal 14b, respectively.

In order to form a connector by using the outer shell 17a and the terminal plate 16, firstly, the wheel 14c is fitted onto the shaft 17f such that part thereof projects out of the casing through the opening, and thereafter, the substrate 13 is fitted into the supporting rails 17d with the terminal plates 16 inserted into the inserting holes 17c so that the terminal plates 16 are exposed within the outer shell 17a. The projections 11c are readily retained in the retaining holes 17a. In this way, the connector is formed by the outer shell 17a and the terminal plates 16 as intended.

With the above constitution, when the wheel 14c is turned from outside, the sliding terminal 14b is slid over the resistor coating 14a, thereby varying the resistor value. Accordingly, the duty of the self oscillating switching is varied and the output voltage can be controlled.

A second preferred embodiment of the present invention will now be described with reference to FIGS. 6 through 9.

Figure 6:
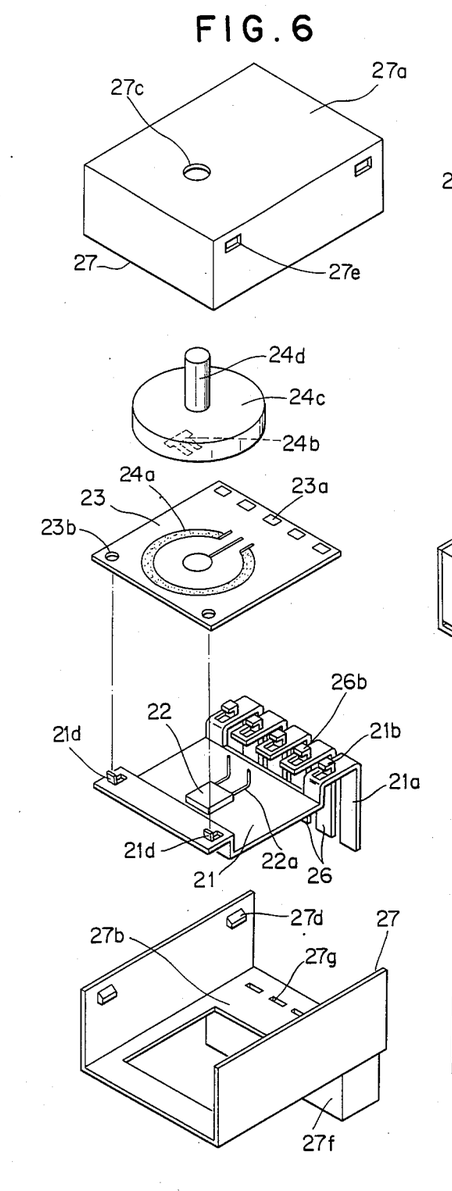
FIG. 6 is an exploded perspective view illustrating a second embodiment according to the present invention.
Figure 8:
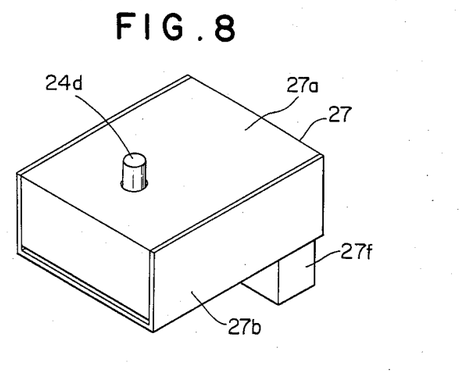
FIG. 8 is a perspective view illustrating an assembled state of the second embodiment of the invention, when viewed from one direction.
Figure 9:
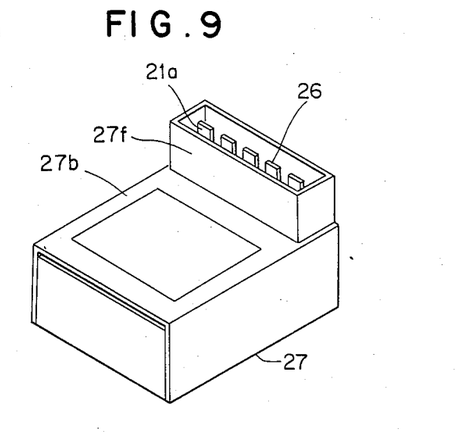
FIG. 9 is likewise a perspective view of the above, but showing when viewed from the other direction.

In the first embodiment described, the wheel 14c is turned horizontally from one open side of the casing 17 in order to control the brightness of the illumination lamp. On the contrary, in this second embodiment, the brightness is controlled by turning a shaft 24d projecting outwardly from the upper surface of an upper casing 27a, and a connector is formed on the under surface of a lower wall 27b.

21 denotes a heat radiating mounting plate which is folded in a channel shape as same as the preceding embodiment. The plate 21 is provided at its central portion with a power transistor 22. The heat radiating mounting plate 21 is also provided with terminals 21a, punching out pieces 21b and projecting pieces 21d thereon. The terminal sections 21a are folded downward.

23 denotes a substrate of a printed board. The substrate 23 is provided with a circuit pattern, rounds 23a for mounting the terminals, and through holes 23b. Moreover, the substrate 23 is soldered with desired electronic parts 15.

26 denotes terminal plates. The plates 26 are formed at the root portions with each of punched-out pieces 26b.

Figure 7:
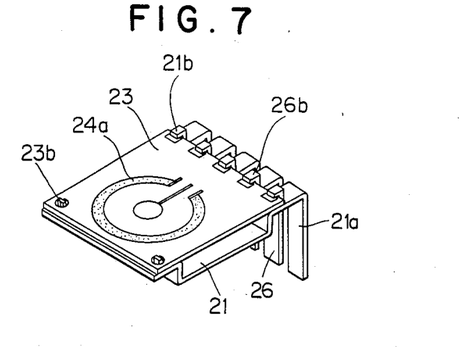
FIG. 7. is a perspective view of a substrate, when assembled, according to the second embodiment of the invention.

The terminals 21a of the heat radiating mounting plate 21 and the terminal plates 26 are designed to hold the substrate 23 with the punched-out pieces 21b and 26b, the projecting pieces 21d of the heat radiating mounting plate 21 are inserted in the through holes 23b of the substrate 23 for soldering the punched-out pieces 21b and 26b together with the rounds 23a, and the projecting pieces 21d together with the through holes 23b, respectively, the heat radiating mounting plate 21 and terminal plates 26 are attached to the substrate 23, and the lead 22a of the power transistor 22 is soldered to the substrate 23 as same as the first embodiment.

A casing 27 containing such substrate 23 as described comprises the upper wall 27a and the lower wall 27b. The upper wall 27a is formed with a shaft supporting hole 27c for permitting the shaft 24d of a turning piece 27c having the sliding terminal 24b to be inserted therethrough, and retaining holes 27e for engaging projections 27d formed on the lower wall 27b in order to bring the upper and lower walls in a closed state.

In addition to the projections 27d, the lower wall 27b is provided at its under surface with an outer shell 27f of a connector and inserting holes 27g for inserting the terminals 21a and terminal plates 26.

When the upper and lower walls 27a and 27b are brought to be in the closed state by inserting the shaft 27d into the shaft supporting hole 27c of the upper wall 27a, and inserting the terminals 21a and terminal plates 26 into the inserting holes 27g for placing the substrate 23 on the lower wall 27b, the turning piece 24c of the variable resistor is rotatably axially supported, and the sliding terminal 24b is slid on the resistor coating 24a, thereby enabling to varying the resistor value.

Accordingly, when a knob is attached to the shaft 24d, the brightness of the illumination lamp can be conveniently controlled by turning the knob.

Now, a third embodiment of the present invention will be described with reference to FIGS. 10 through 13.

Figure 10:
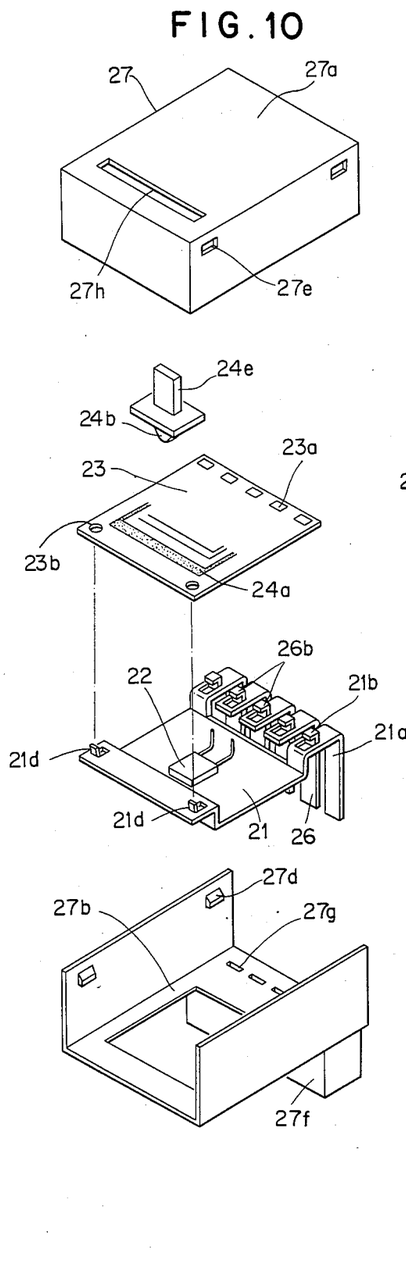
FIG. 10 is an exploded perspective view illustrating a third embodiment of the present invention.

The third embodiment is as same as the second embodiment only excepting the following points.

Figure 11:
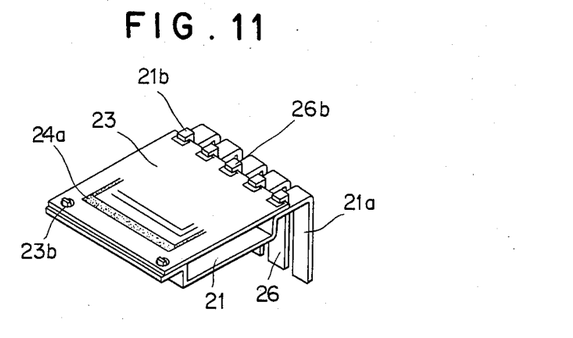
FIG. 11 is a perspective view of a substrate, when assembled, according to the third embodiment of the invention.

The resistor coating 24a of the variable resistor provided on the substrate 23 is formed in a linear shape, and the upper wall 27a is formed with a linear shaped guide hole 27h.

Figure 12:
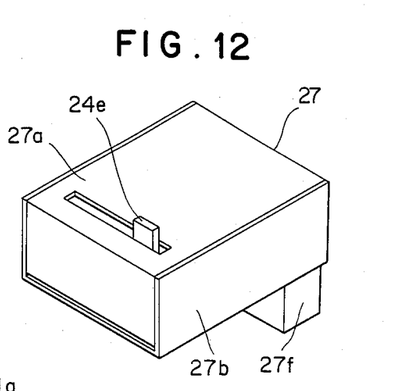
FIG. 12 is a perspective view illustrating an assembled state of the third embodiment of the invention, when viewed from one direction.
Figure 13:
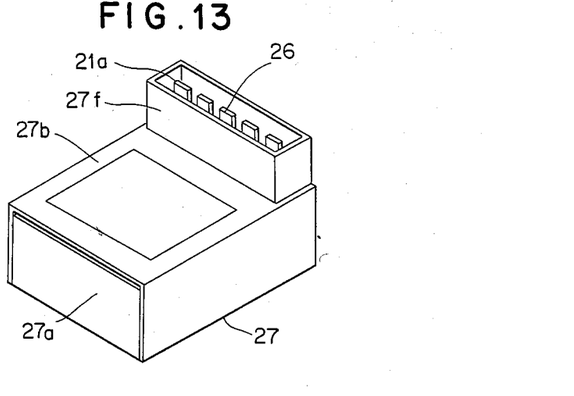
FIG. 13 is likewise a perspective view of the above, but showing when viewed from the other direction.

The knob piece 24e having the sliding terminal 24b of the variable resistor is inserted in the aforementioned guide hole 27h and slided sideways therealong. Thus, the brightness of the illumination lamp can be adequately controlled by varying the resistor value.

Referring to FIGS. 14 through 17, a fourth embodiment will be described.

Figures 14, 15, 16:
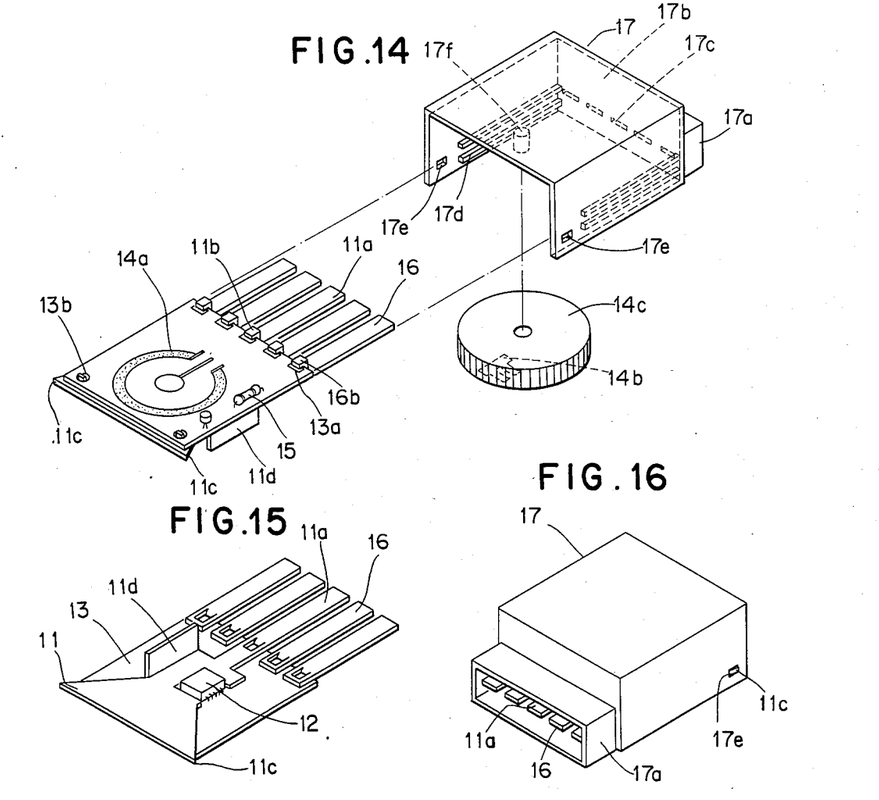
FIG. 14 is an exploded perspective view illustrating a fourth embodiment of the present invention.
FIG. 15 is a perspective view illustrating the rear surface of a substrate according to the fourth embodiment of the invention.
FIG. 16 is a perspective view illustrating an assembled state of the fourth embodiment of the invention, when viewed from one direction.

11 denotes a mounting plate for mounting a power transistor 12 thereon. The plate 11 is formed at its one end with terminals 11a, at its root portion with punchedout plate 11b, and at its other side with projections 11c. Moreover, a heat radiating fin 11d is folded and erected on the mounting plate 11.

13 denotes either a printed board made of such material as aluminum, ceramic or metal plate coated with an insulating material, and has a high heat conductive property as well as a heat resisting property, or a substrate on which electronic parts 15 each having a heat resisting property are soldered.

The substrate 13 is provided at its one surface with a resistor coating 14a of a variable resistor. The other surface of the substrate 13 is attached therealong with the mounting plate 11 in such a manner as to hold the substrate 13 with its punched-out pieces 11b. The rounds 13a of the substrate 13 and the punched-out pieces 11b are soldered together, while the through holes 13b of the substrate 13 and the mounting plate 11 are soldered together. Similarly, the feet of the power transistor 12 is soldered to the circuit pattern of the substrate 13.

16 denotes terminal plates. The plates 16 are formed at the root portions with each of punched-out pieces 16b. The punched-out pieces 16b and the rounds 13a of the substrate 13 are soldered together with the substrate 13 held by the punched-out pieces 16b as in the casing with the terminal 11a. In this way, the terminal plates 16 are attached, side by side with the terminal 11a, to the substrate 13.

17 denotes a casing made of an insulating material such as plastic. The casing 17 is formed at its rear side with an outer shell of a connector, at its partition wall 17b of the outer shell 17a with inserting holes 17c, at its inner surface with supporting rails 17d and retaining holes 17e, and at its upper inner surface with a shaft 17f for rotatably mounting a wheel 14c of a variable resistor including a sliding terminal 14b, respectively.

Figure 17:
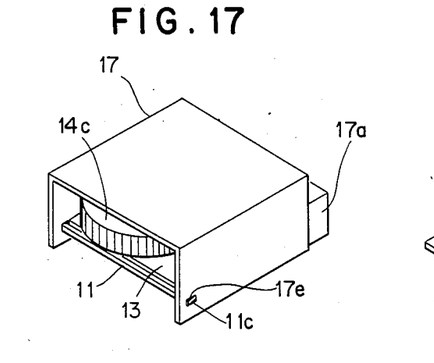
FIG. 17 is likewise a perspective view of the above, but showing when viewed from the other direction.

In order to form a connector by using the outer shell 17a and the terminal plates 16, firstly, the wheel 14c is fitted onto the shaft 17f, and thereafter, the substrate 13 is fitted into the supporting rails 17d with the terminal plates 16 inserted into the inserting holes 17c so that the terminal plates 16 are exposed within the outer shell 17a. The projections 11c are readily retained in the retaining holes 17e. In this way, the connector is formed by the outer shell 17a and the terminal plates 16 as intended.

With the above constitution, when the wheel 14c is turned from outside, the sliding terminal 14b is slid over the resistor coating 14a, thereby varying the resistor value. Accordingly, the duty of the self oscillating switching is varied and the output voltage can be controlled.

Nextly, a fifth embodiment of the present invention will be described with reference to FIGS. 18 through 21.

Figure 18:
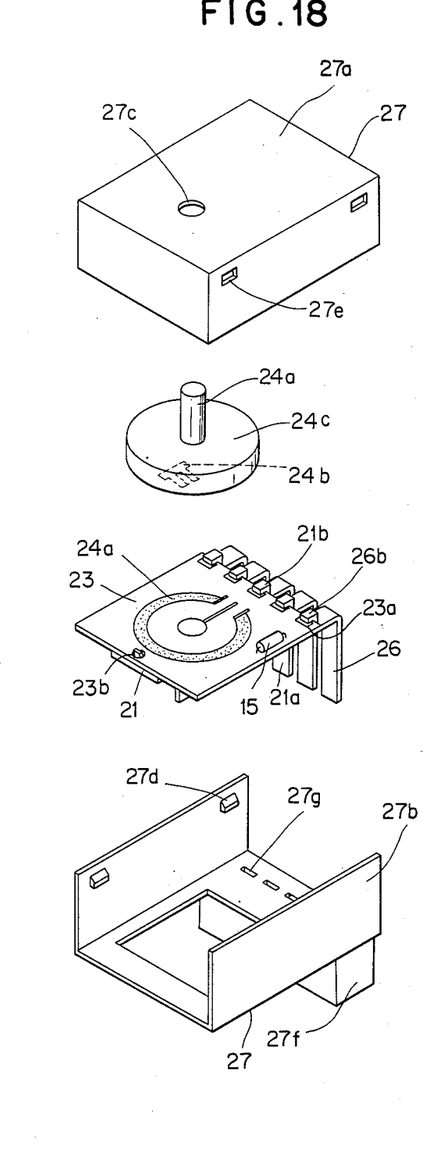
FIG. 18 is an exploded perspective view illustrating a fifth embodiment of the present invention.
Figures 20, 21, 23, 24, 25:
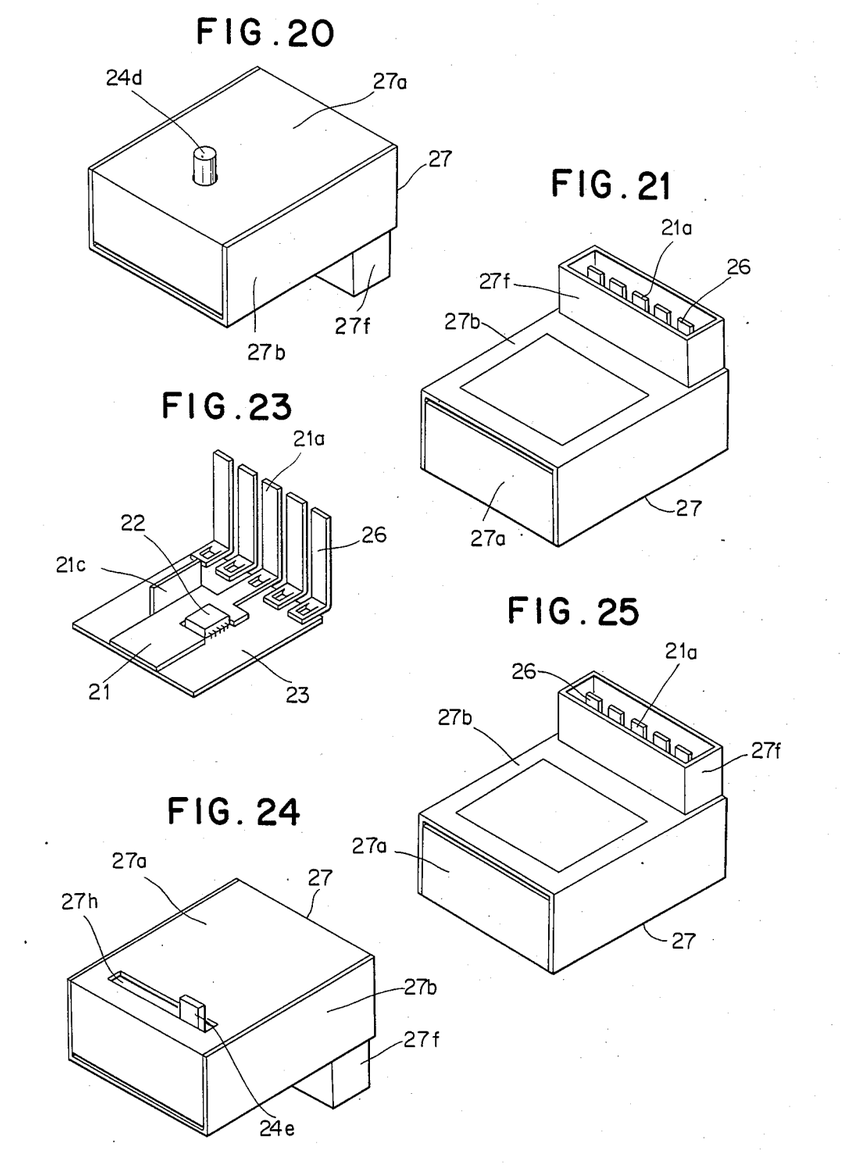
FIG. 20 is a perspective view illustrating an assembled state of the fifth embodiment of the invention, when viewed from one direction.
FIG. 21 is likewise a perspective view of the above, but showing when viewed from the other direction.
FIG. 23 is a perspective view illustrating the rear surface of a substrate according to the sixth embodiment of the invention.
FIG. 24 is a perspective view illustrating an assembled state of the sixth embodiment of the invention, when viewed from one direction.
FIG. 25 is likewise a perspective view of the above, but showing when viewed from the other direction.

In the fourth embodiment described, the wheel 14c is turned horizontally from one open side of the casing 17 in order to control the brightness of the illumination lamp. On the contrary, in this second embodiment, the brightness is controlled by turning a shaft 24d projecting outwardly from the upper surface of an upper wall 27a, and a connector is formed on the under surface of a lower wall 27b.

21 denotes a mounting plate of the power transistor 22. The plate 21 is formed with a terminal 21a, a punched-out piece 21b and a heat radiating fin 21c as in the casing with the mounting plate 11 of the preceding embodiment.

Figure 19:
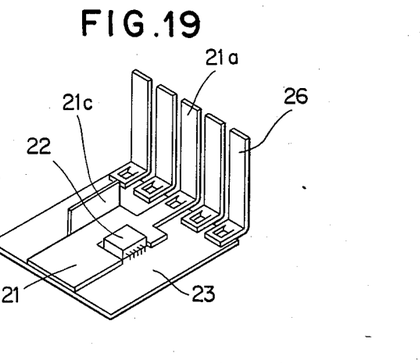
FIG. 19 is a perspective view illustrating the rear surface of a substrate according to the fifth embodiment of the invention.

23 denotes a substrate of a printed board. The substrate 23 is provided with a resistor coating 24a of the variable resistor, a circuit pattern, electronic parts 15 soldered thereto, rounds 23a for mounting the terminal, and through holes 23b as in the casing with the substrate 13 of the preceding embodiment.

And, as in the same manner described with respect to the preceding embodiment, the mounting plate 21 is mounted, the lead of the power transistor 22 are soldered to the circuit pattern, and the terminal plates 26 are attached, side by side with the terminal 21b, to the substrate 23.

A casing 27 containing such substrate 23 as described comprises the upper wall 27a and the lower wall 27b. The upper wall 27a is formed with a shaft supporting hole 27c for permitting the shaft 24d of a turning piece 24c having the sliding terminal 24b to be inserted therethrough, and retaining holes 27e for engaging projections 27d formed on the lower wall 27b in order to bring the upper and lower walls in a closed state.

In addition to the projections 27d, the lower walls 27b is provided at its under surface with an outer shell 27f of a connector and inserting holes 27g for inserting the terminal 21a and terminal plates 26.

When the upper and lower walls 27a and 27b are brought to be in the closed state by inserting the shaft 24a into the shaft supporting hole 27c of the upper casing 27a, and inserting the terminals 21a and terminal plates 26 into the inserting holes 27g for placing the substrate 23 on the lower wall 27b, the turning piece 24c of the variable resistor is rotatably axially supported, and the sliding terminal 24b is slid over the resistor coating 24a, thereby enabling to varying the resistor value.

Accordingly, when a knob is attached to the shaft 24d, the brightness of the illumination lamp can be conveniently controlled by turning the knob.

Finally, a sixth embodiment of the present invention will be described with reference to FIGS. 22 through 25. The sixth embodiment is as same as the fifth embodiment only excepting the following points.

Figure 22:
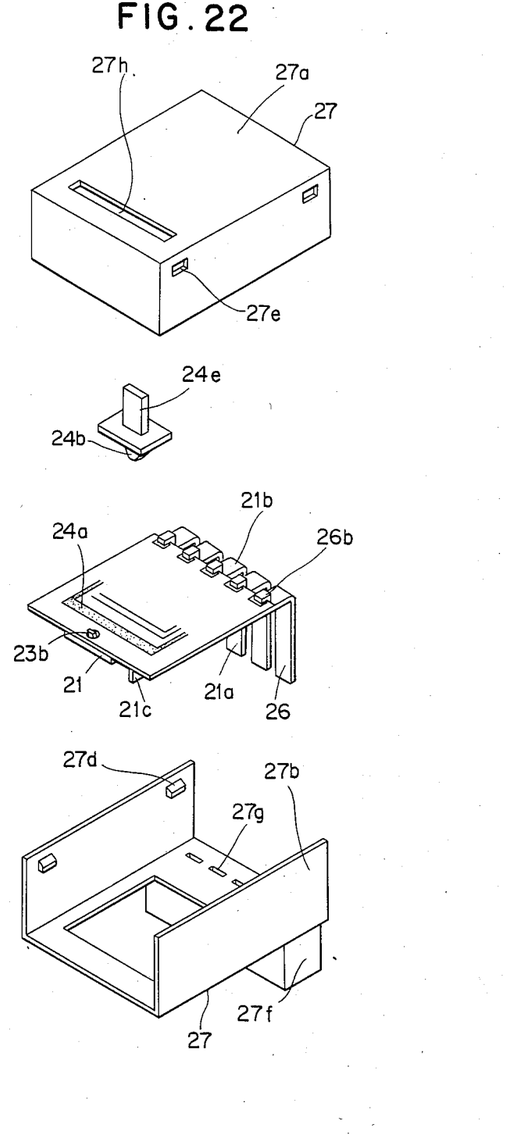
FIG. 22 is an exploded perspective view illustrating a sixth embodiment of the present invention.

The resistor coating 24a of the variable resistor provided on the substrate 23 is formed in a linear shape, and the upper wall 27a is formed with an elongated shaped guide hole 27h.

The knob piece 24e having the sliding terminal 24b of the variable resistor is inserted in the aforementioned guide hole 27h and slid sideways therealong. Thus, the brightness of the illumination lamp can be adequately controlled by varying the resistor value.

As described in the foregoing, according to the present invention, an already completed variable resistor is not used. Instead, a resistor of a variable resistor is mounted on a substrate provided with electronic parts. In this way, since it is designed to serve as a variable resistor only after it is assembled, it is not so bulky as the conventional apparatus using a completed variable resistor. Furthermore, since a high density of the circuit board is made possible, the installation space can be reduced.

Furthermore, since the resistor can be such designed as to have its own resisting curve, the operating state and the controlling of the brightness can be matched.

Furthermore, a terminal of the connector is directly mounted on the substrate so that it will form the connector together with the casing, it is no more required to take such trouble as to solder lead wires nor to solder the connector to such lead wires as required in the conventional apparatus. Accordingly, costs of the parts as well as assembling charges can be reduced.

Furthermore, since the soldering of the terminal of the variable resistor which was an important factor to decrease the reliability of the conventional apparatus is no more required, a reliability is increased extensively, Furthermore, since the power transistor of the electric driver circuit having a large heating value is mounted on the heat radiating mounting plate, and a space is formed between the heat radiating mounting plate and substrate, the heat radiating mounting plate and power transistor can be effectively cooled by means of air flowing through the space, and increase of the temperature can be reduced.

Simultaneously, due to the aforementioned space, the heat of the heat radiating mounting plate and power transistor is prevented to transmit to the substrate. This means that even such substrate and electronic parts mounted thereof as having low heat resisting properties can be used. Thus, the costs can be reduced.

What is claimed is:

1. A light control apparatus for an automobile comprising
a casing having a plurality of walls defining a chamber therein, said casing further having an opening at a selected one of said walls, a selected another of said walls having a plurality of holes therein, and an outer shell projecting adjacent said another wall;
a mounting plate adapted to radiate heat and mounted within said casing, said mounting plate having at least one terminal section inserted through one of said holes and accommodated in the outer shell which functions as a terminal housing and said mounting plate having a power transistor mounted thereon, said terminal section also being formed to function as a heat-radiating member;
a substrate mounted on said mounting plate and adapted to serve as a printed board including a printed resistor coating and electronic parts; and
a knob provided movably within said casing and having a variable resistor terminal adapted to slide over said resistor coating upon said movement within said casing, part of said knob projecting from said casing through said opening for manual operation,
wherein said mounting plate is channel-shaped and has a main section and a pair of first and second wing sections elevated above the main section, said at least one terminal section extending from a top of the first wing section, said substrate bridging over the wing sections and said main section of the mounting plate being separated with a gap formed therebetween on account of a difference of elevation of the wing sections and the main section, said power transistor mounted within said gap.

2. A light control apparatus according to claim 1, wherein said mounting plate is of a metal of high heat conductivity.

3. A light control apparatus according to claim 1, wherein said knob includes a rotary member provided in said casing for axial rotation.

4. A light control apparatus according to claim 1, wherein said selected another of the walls is positioned opposite said opening, said at least one terminal section extending substantially parallel with the main section such that said terminal extends out the casing through the hole.

5. A light control apparatus according to claim 1, wherein said selected another of the walls extends perpendicular to said opening, said at least one terminal section having a first section generally parallel with the main section and a second section generally perpendicular to the main section such that said terminal extends out the casing through the hole.

6. A light control apparatus according to claim 1, wherein said opening includes a knob hole formed in a wall parallel with the substrate, said knob including a rotary member and a shaft attached thereon extending out the casing through said knob hole.

7. A light control apparatus according to claim 1, wherein said opening includes an elongated hole formed in a wall parallel with the substrate, said knob including a sliding member and a knob piece attached thereon.

8. A light control apparatus for an automobile comprising

- a casing having a plurality of walls defining a chamber therein, said casing further having an opening at a selected one of said walls, a selected another of said walls having a plurality of holes therein and an outer shell projecting adjacent said another wall;
- a mounting plate adapted to radiate heat and mounted within said casing, said mounting plate having at least one terminal section inserted through one of said holes and accommodated in the outer shell which functions as a terminal housing and said mounting plate having a power transistor mounted thereon and at least one fin erected therefrom to function as a heat radiating member, said terminal section also being formed to function as a heatradiating member;
- a thermal resistant and highly heat conductive substrate made of a ceramic or insulation-coated metal plate mounted on said mounting plate and adapted to also radiate heat and to serve as a printed board including a printed resistor coating and electronic parts; and
- a knob provided movably within said casing and having a variable resistor terminal adapted to slide over said resistor coating upon said movement within said casing, part of said knob projecting from said casing through said opening for manual operation.

* * * * *